US011392984B2

(12) United States Patent
Ma et al.

(10) Patent No.: US 11,392,984 B2
(45) Date of Patent: Jul. 19, 2022

(54) METHODS AND APPARATUS FOR AUTOMATICALLY PROVIDING ITEM ADVERTISEMENT RECOMMENDATIONS

(71) Applicant: Walmart Apollo, LLC, Bentonville, AR (US)

(72) Inventors: Luyi Ma, Sunnyvale, CA (US); Hyun Duk Cho, San Francisco, CA (US); Sushant Kumar, Sunnyvale, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/689,351

(22) Filed: Nov. 20, 2019

(65) Prior Publication Data

US 2021/0150570 A1    May 20, 2021

(51) Int. Cl.
*G06Q 30/00*    (2012.01)
*G06Q 30/02*    (2012.01)
*G06N 20/00*    (2019.01)

(52) U.S. Cl.
CPC ......... *G06Q 30/0254* (2013.01); *G06N 20/00* (2019.01); *G06Q 30/0201* (2013.01)

(58) Field of Classification Search
CPC . G06Q 30/0254; G06Q 30/0201; G06N 20/00
See application file for complete search history.

(56) References Cited

U.S. PATENT DOCUMENTS

| 4,833,609 A | 5/1989 | Grulke, Jr. et al. |
| 7,313,782 B2 | 12/2007 | Lurie et al. |

(Continued)

FOREIGN PATENT DOCUMENTS

| CN | 110415065 A | 11/2019 | |
| WO | WO-2019151506 A1 * | 8/2019 | ............. G06K 9/623 |
| WO | WO-2020142837 A1 * | 7/2020 | ........... G06Q 10/047 |

OTHER PUBLICATIONS

Quadrana; Sequence-Aware Recommender Systems; ACM 2018; 35 pages; Feb. 2018.*

(Continued)

*Primary Examiner* — Radu Andrei
(74) *Attorney, Agent, or Firm* — Duane Morris LLP; Manita Rawat

(57) ABSTRACT

This application relates to apparatus and methods for automatically determining and providing item category advertisement recommendations. In some examples, a computing device obtains transaction data identifying historical transactions. The computing device generates a first model, and trains the first model with non-seasonal data. The computing device generates a second model, and trains the second model with seasonal data. The computing device then generates a seasonal re-rank model based on the first model and the second model. The seasonal re-rank model, when executed, identifies probabilities of purchase of categories of items. In some examples, the computing device selects item advertisements to provide for display to a customer based on the probabilities of purchase of categories of items determined by the seasonal re-rank model. The selected item advertisements may be displayed to the customer, for example, on a website.

17 Claims, 7 Drawing Sheets

(56) References Cited

U.S. PATENT DOCUMENTS

| | | | |
|---|---|---|---|
| 7,926,604 B2 | 6/2011 | Morris et al. | |
| 8,443,384 B2 | 5/2013 | Larner et al. | |
| 8,615,524 B2 | 12/2013 | Kanigsberg | |
| 9,129,305 B2 | 9/2015 | Lamer et al. | |
| 9,959,553 B2 | 5/2018 | Lamer et al. | |
| 10,204,356 B2 | 2/2019 | Ferber et al. | |
| 10,248,712 B1* | 4/2019 | Cheng | G06F 16/243 |
| 10,430,825 B2 | 10/2019 | Chaudhuri et al. | |
| 10,452,978 B2 | 10/2019 | Shazeer et al. | |
| 10,546,326 B2 | 1/2020 | Publicover et al. | |
| 10,552,866 B2 | 2/2020 | Muppirala et al. | |
| 10,796,303 B2 | 10/2020 | Dutta et al. | |
| 10,796,321 B1 | 10/2020 | Balakrishnan et al. | |
| 10,902,341 B1* | 1/2021 | Qureshi | G06F 9/4881 |
| 2002/0077901 A1 | 6/2002 | Katz | |
| 2006/0036510 A1 | 2/2006 | Westphal et al. | |
| 2007/0250855 A1 | 10/2007 | Quinn-Jacobs et al. | |
| 2008/0250450 A1 | 10/2008 | Lamer et al. | |
| 2010/0063644 A1* | 3/2010 | Kansal | G06Q 30/06 700/295 |
| 2011/0246285 A1* | 10/2011 | Ratnaparkhi | G06Q 30/0243 705/14.42 |
| 2013/0031350 A1 | 1/2013 | Thielen et al. | |
| 2013/0226995 A1 | 8/2013 | Etheredge et al. | |
| 2013/0290064 A1 | 10/2013 | Altamirano et al. | |
| 2013/0326354 A1 | 12/2013 | Anderson | |
| 2014/0012673 A1 | 1/2014 | Lamer et al. | |
| 2014/0114757 A1 | 4/2014 | Frankel et al. | |
| 2014/0136127 A1 | 5/2014 | Sanchez Galicia et al. | |
| 2014/0207680 A1 | 7/2014 | Rephlo | |
| 2015/0112807 A1 | 4/2015 | Muppirala et al. | |
| 2015/0149321 A1 | 5/2015 | Salameh et al. | |
| 2015/0262249 A1* | 9/2015 | Wical | G06Q 30/0257 705/14.55 |
| 2015/0294334 A1 | 10/2015 | Ming et al. | |
| 2015/0339722 A1 | 11/2015 | Hensgen et al. | |
| 2015/0348119 A1 | 12/2015 | Ferber et al. | |
| 2016/0019271 A1* | 1/2016 | Ma | G06F 16/955 707/756 |
| 2016/0132935 A1 | 5/2016 | Shen et al. | |
| 2016/0180442 A1 | 6/2016 | Bar et al. | |
| 2016/0253710 A1 | 9/2016 | Publicover et al. | |
| 2016/0300202 A1* | 10/2016 | Xu | G06Q 20/4014 |
| 2016/0330232 A1 | 11/2016 | Kumar | |
| 2016/0379251 A1 | 12/2016 | Sanjay et al. | |
| 2017/0004557 A1 | 1/2017 | Glasgow et al. | |
| 2017/0018018 A1 | 1/2017 | Akpala et al. | |
| 2017/0024663 A1* | 1/2017 | Liu | G06N 20/00 |
| 2017/0140440 A1 | 5/2017 | Sripadham et al. | |
| 2017/0220945 A1* | 8/2017 | Barger | G06N 7/005 |
| 2017/0236182 A1 | 8/2017 | Ignatyev | |
| 2017/0249564 A1 | 8/2017 | Garvey et al. | |
| 2017/0318350 A1 | 11/2017 | Wielgosz | |
| 2018/0075502 A1 | 3/2018 | Dika | |
| 2018/0276776 A1 | 9/2018 | Morrow | |
| 2018/0302291 A1 | 10/2018 | Srinivasan et al. | |
| 2018/0341656 A1* | 11/2018 | Kwok | G06F 16/24578 |
| 2018/0341860 A1 | 11/2018 | Shazeer et al. | |
| 2018/0349797 A1 | 12/2018 | Garvey et al. | |
| 2019/0073669 A1 | 3/2019 | Dutta et al. | |
| 2019/0175133 A1 | 6/2019 | Lin et al. | |
| 2019/0373007 A1* | 12/2019 | Salunke | G06F 11/3452 |
| 2020/0021893 A1 | 1/2020 | Muller et al. | |
| 2020/0125471 A1 | 4/2020 | Garvey et al. | |
| 2020/0125988 A1 | 4/2020 | Garvey et al. | |
| 2020/0233774 A1 | 7/2020 | Toledano | |
| 2020/0349271 A1 | 11/2020 | Binkley et al. | |
| 2021/0150570 A1 | 5/2021 | Ma et al. | |

OTHER PUBLICATIONS

Yang; An_Improved_Recommendation_Algorithm_for_Micro-blog_Network_Advertisement; ISDC 2018; pp. 284-287; 2018.*

Yedder; Modeling_predictionjn_recommender_systems_using_restricted_boltzmann_machine; IEEE 2017; pp. 2063-2068; 2017.*

Lee D D et al., "Learning the Parts of Objects by Non-Negative Matrix Factorization[J]", Nature, 1999, 401(6755):788.

* cited by examiner

METHODS AND APPARATUS FOR AUTOMATICALLY PROVIDING ITEM ADVERTISEMENT RECOMMENDATIONS

TECHNICAL FIELD

The disclosure relates generally to digital advertisements and, more specifically, to electronically determining and providing digital item recommendations.

BACKGROUND

At least some websites, such as retailer websites, display item advertisements. For example, a website may display item advertisements, and may further allow a customer to purchase advertised items. The displayed advertisements may be determined by advertisement recommendation systems, which may attempt to provide advertisements for items which the customer may be interested in. In some examples, however, the advertisement recommendation systems may provide advertisements for items that the customer finds irrelevant or is not interested in.

As a result, a retailer may lose sales of items to a customer. For example, the customer may not buy the advertised item. In addition, the customer may leave the website without having purchased an item that, if shown an advertisement for, the customer would have purchased. In some examples, the customer may go elsewhere, such as another website, to make purchases. As such, there are opportunities to address advertisement recommendation systems.

SUMMARY

The embodiments described herein are directed to automatically determining and providing digital item advertisements that may be displayed, for example, on a website. The embodiments may allow a person, such as a customer, to be presented with advertisements that may be more likely to interest the person. For example, the embodiments may allow the person to view advertisements that the person may be more willing to purchase.

In some examples, the embodiments determine item advertisements (e.g., item advertisement recommendations) based on categories of items. For example, the embodiments may determine categories of previously purchased items for a customer, and may determine item advertisements based on the categories. In some examples, the embodiments may determine item advertisements for items based on a time of year, such as a season (e.g., winter, spring, summer, or fall), a shopping season (e.g., holiday shopping season), a range of dates, a duration of time during a special event (e.g., during a festival), or any other suitable time of year. The embodiments may employ machine learning based processes (e.g., algorithms) to determine the item advertisements. The embodiments may train the machine learning based processes on transaction data, for example. In some examples, the item advertisements are personalized to each person.

As a result, the embodiments may allow a retailer to present more relevant item advertisements to each person, thereby increasing the chances that the person will purchase the advertised items. In addition, because a person may now spend less time reviewing irrelevant advertisements, the person may have additional time to consider additional items for purchase. In addition to or instead of these example advantages, persons of ordinary skill in the art having the benefit of these disclosures would recognize and appreciate other advantages as well.

In accordance with various embodiments, exemplary systems may be implemented in any suitable hardware or hardware and software, such as in any suitable computing device. For example, in some embodiments, a computing device is configured to obtain a first model trained with seasonal data identifying first item categories, and obtain a second model trained with non-seasonal data identifying second item categories. In some examples, the computing device generates each of the first model and the second model. The computing device may also be configured to obtain transaction data identifying a plurality of historical transactions for a plurality of customers. Further, the computing device may be configured to determine a plurality of categories based on the obtained transaction data. The categories may be item categories, for example. The computing device may be configured to determine whether each category of the plurality of categories is included in one or more of the first item categories and second item categories. The computing device may further be configured to generate data identifying a seasonal re-rank model based on the first model, the second model, and the determinations of whether each category of the plurality of categories is included in one or more of the first item categories and second item categories.

In some examples, the computing device is configured to obtain a ranking of categories, and apply the seasonal re-rank model to the ranking of categories. The computing device can also be configured to re-rank the ranking of categories based on the application of the seasonal re-rank model to the ranking of categories. In some examples, the computing device is configured to execute the data identifying the seasonal re-rank model, and to determine a category of items to advertise based on the execution of the data.

In some embodiments, a method is provided that includes obtaining a first model trained with seasonal data identifying first item categories, and obtaining a second model trained with non-seasonal data identifying second item categories. The method may also include obtaining transaction data identifying a plurality of historical transactions for a plurality of customers. Further, the method may include determining a plurality of categories based on the obtained transaction data. The method may also include determining whether each category of the plurality of categories is included in one or more of the first item categories and second item categories. The method may further include generating data identifying a seasonal re-rank model based on the first model, the second model, and the determinations of whether each category of the plurality of categories is included in one or more of the first item categories and second item categories.

In some examples, the method includes obtaining a ranking of categories, and applying the seasonal re-rank model to the ranking of categories. The method can also include re-ranking the ranking of categories based on the application of the seasonal re-rank model to the ranking of categories. In some examples, the method includes executing the data identifying the seasonal re-rank model, and determining a category of items to advertise based on the execution of the data.

In yet other embodiments, a non-transitory computer readable medium has instructions stored thereon, where the instructions, when executed by at least one processor, cause a computing device to perform operations that include obtaining a first model trained with seasonal data identifying first item categories, and obtaining a second model trained with non-seasonal data identifying second item categories. The operations may also include obtaining transaction data identifying a plurality of historical transactions for a plurality of customers. Further, the operations may include determining a plurality of categories based on the obtained transaction data. The operations may also include determining whether each category of the plurality of categories is included in one or more of the first item categories and second item categories. The operations may further include generating data identifying a seasonal re-rank model based on the first model, the second model, and the determinations of whether each category of the plurality of categories is included in one or more of the first item categories and second item categories.

In some examples, the operations include obtaining a ranking of categories, and applying the seasonal re-rank model to the ranking of categories. The operations can also include re-ranking the ranking of categories based on the application of the seasonal re-rank model to the ranking of categories. In some examples, the operations include executing the data identifying the seasonal re-rank model, and determining a category of items to advertise based on the execution of the data.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
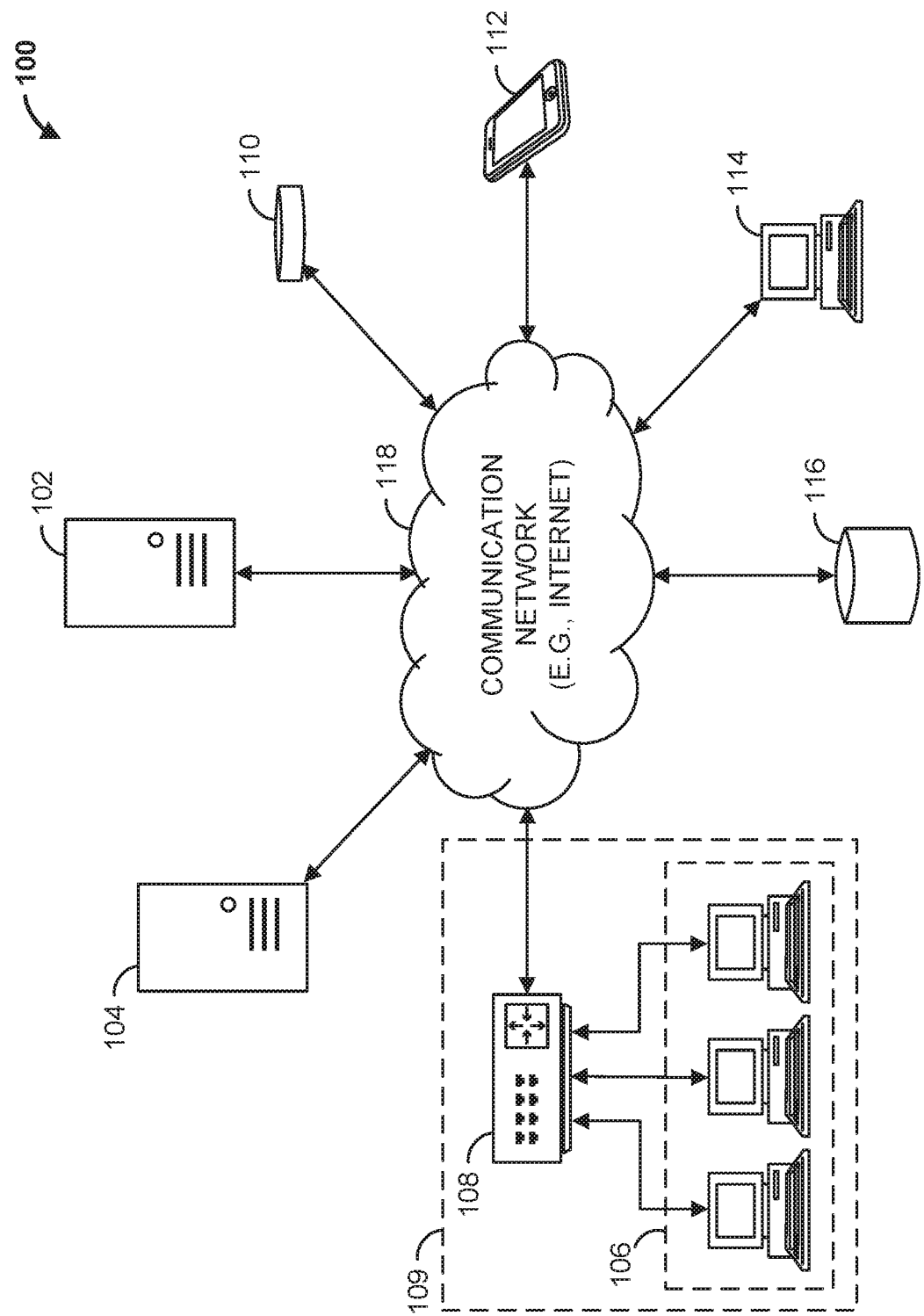
FIG. 1 is a block diagram of a digital advertisement customization system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a digital advertisement customization system 100 that includes an advertisement customization computing device 102 (e.g., a server, such as an application server), a web server 104, workstation(s) 106, database 116, and multiple customer computing devices 110, 112, 114 operatively coupled over network 118. Advertisement customization computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, advertisement customization computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, advertisement customization computing device 102 is operated by a retailer, and multiple customer computing devices 112, 114 are operated by customers of the retailer.

Although FIG. 1 illustrates three customer computing devices 110, 112, 114, digital advertisement customization system 100 can include any number of customer computing devices 110, 112, 114. Similarly, digital advertisement customization system 100 can include any number of workstation(s) 106, advertisement customization computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with advertisement customization computing device 102 over communication network 118. The workstation(s) 106 may send data to, and receive data from, advertisement customization computing device 102. For example, the workstation(s) 106 may transmit data related to an order purchased by a customer at store 109 to advertisement customization computing device 102. In response, advertisement customization computing device 102 may transmit an indication of one or more item advertisements to provide to the purchasing customer. For example, the item advertisements may be displayed on a receipt handed to the customer for the purchase order.

In some examples, web server 104 may host one or more web pages, such as a retailer's website. Web server 104 may transmit data related to an order purchased on the website by a customer to advertisement customization computing device 102. In response, advertisement customization computing device 102 may transmit an indication of one or more item advertisements to display on the website to the purchasing customer. For example, the item advertisements may be displayed on a checkout webpage, on a homepage, or on a webpage dedicated to a category of the advertised item when the customer is browsing that webpage.

First customer computing device 110, second customer computing device 112, and $N^{th}$ customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer that allows for the purchase of items. For example, the website may list prices for advertised items. An operator of one of multiple computing devices 110, 112, 114 may access the website hosted by web server 104, add one or more items to an online shopping cart of the website, and perform an online checkout of the shopping cart to purchase the items for the listed prices.

Advertisement customization computing device 102 is operable to communicate with database 116 over communication network 118. For example, advertisement customization computing device 102 can store data to, and read data from, database 116. Database 116 can be a remote storage device, such as a cloud-based server, a memory device on another application server, a networked computer, or any other suitable remote storage. Although shown remote to advertisement customization computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Advertisement customization computing device 102 can generate, for each of a plurality of customers, item advertisements that one or more customers may be interested in. For example, advertisement customization computing device 102 may identify one or more categories of items (e.g., from a taxonomy of items) that may be more relevant (e.g., more likely to be purchased) during a particular season for a particular customer. For example, if a customer is purchasing items during the winter, the customer may not be as interested in "barbeque-related products" as in "hot liquid items" such as hot cocoa products, for example. An item may belong to any number of categories and, in some examples, to any number of sub-categories. For example, milk, eggs, and cheese may below to a category of "dairy products," while milk may also belong to a category of "liquid products." In addition, each cheese product may below to a sub-category, under the category of "dairy products," of "cheese products." Similarly, eggs may below to an "egg product" sub-category, and milk may belong to a "milk product" sub-category.

To determine item advertisements, advertisement customization computing device 102 may determine a relevancy score between two or more items based on their categories and the particular season. Based on the relevancy scores, advertisement customization computing device 102 may select and/or provide item advertisements. For example, advertisement customization computing device 102 may select and/or provide item advertisements with relatively higher relevancy scores during the particular season.

Advertisement customization computing device 102 can account for "drifts" (e.g., changes) in relevancy scores between two or more items. To capture "drifts" in season category relevancies, advertisement customization computing device 102 may employ a machine learning process (e.g., algorithm), such as one based on a Bayesian-based machine learning model, to capture drifts in category relevancy over time. The Bayesian-based machine learning model may be iterative and able to learn whether a given category is seasonal (e.g., is associated with changing relevancy scores depending on a season) or not without labelled data. For example, paper towels may be considered non-seasonal.

In some examples, the machine learning process is trained with historical data. For example, the machine learning models may be trained with historical transaction data identifying purchases, including items and corresponding categories for the items, for a plurality of customers. In some examples, the machine learning process is trained with online session data identifying website actions, such as item advertisement clicks or items added to an online shopping cart (e.g., add-to-cart data), and corresponding categories for the items, for a plurality of customers.

Category Relevancy

To determine item advertisement recommendations, relevancy scores between item categories are determined according to a category relevancy model. As an example of a category relevancy model that is based on a non-negative factorization (NMF) model, let $D^{|N|\times|M|}$ represent an input matrix generated based on historical transaction data for a plurality of users. Given a target value k, which identifies a number of latent categories of the model, advertisement customization computing device 102 generates two low-rank matrices $W^{|N|\times|k|}$ and $H^{|k|\times|M|}$ to approximate the original category matrix D as close as possible such that an entry of W and H is non-negative (i.e., W≥0 and H≥0). An objective function may be executed to determine the optimal machine learning algorithm. An example of an objective function is given by the equation below:

$$\underset{W\geq 0, H\geq 0}{\mathrm{argmin}} \|D - WH\|_2^2 \qquad \text{(eq. 1)}$$

Complementary relationship benefits can be realized from the non-negative constraints on both W and H. Here, matrices W and H represent, respectively, a low rank matrix for customers and a low rank matrix for item categories.

Advertisement customization computing device 102 can compute the relevancy between any pair of categories. For example, advertisement customization computing device 102 can map each category (i.e., matrix H) into a latent embedding space represented by $H_{cat}$. The relevancy between any pair of categories can be computed based on the distance of their embedding $H_{cat}$. For example, the cosine similarity between any pair of categories can be used to determine relevancy, as given by the equation below.

$$\text{relevancy} = \frac{H_{cat_i} \cdot H_{cat_j}}{\sqrt{\|H_{cat_i}\|^2}\sqrt{\|H_{cat_j}\|^2}} \quad \text{(eq. 2)}$$

Any pairs of categories with a relevance score above a threshold may be considered conceptually relevant. In some examples, advertisement customization computing device 102 prevents any item advertisements for items in categories with relevancy scores below the threshold, and allows item advertisements for items in categories with relevancy scores at or above the threshold.

Causality of Seasonality

To select item advertisements, in some examples, advertisement customization computing device 102 obtains in-store purchase data for one or more customers. The in-store purchase data may identify previous purchases the customers have made in a store, such as store 109. In some examples, advertisement customization computing device 102 may obtain online purchase data for the customers. The online purchase data may identify previous purchases the customers have made online, such as from a website hosted by web server 104. Advertisement customization computing device 102 may, in some examples, obtain online session data for each of a plurality of customers from web server 104. The online session data may identify data associated with an online session, such as an online session the customers engaged in when viewing a website. For example, online session data may identify one or more of: advertisements the customers have viewed; advertisements the customers have clicked on; items that the customers have added to an online shopping cart; items that the customers have clicked on; and search queries, for example.

Based on the obtained the in-store purchase data, online purchase data, and/or online session data, advertisement customization computing device 102 can adjust category relevancy scores to account for a season, such as a current season. As such, rather than having to retrain the machine learning process every season change, advertisement customization computing device 102 can determine a real-time adjustment to category relevancy scores by taking into account a season and whether an item is seasonal (e.g., the relevancy score for the item), as discussed further below.

Figure 4:
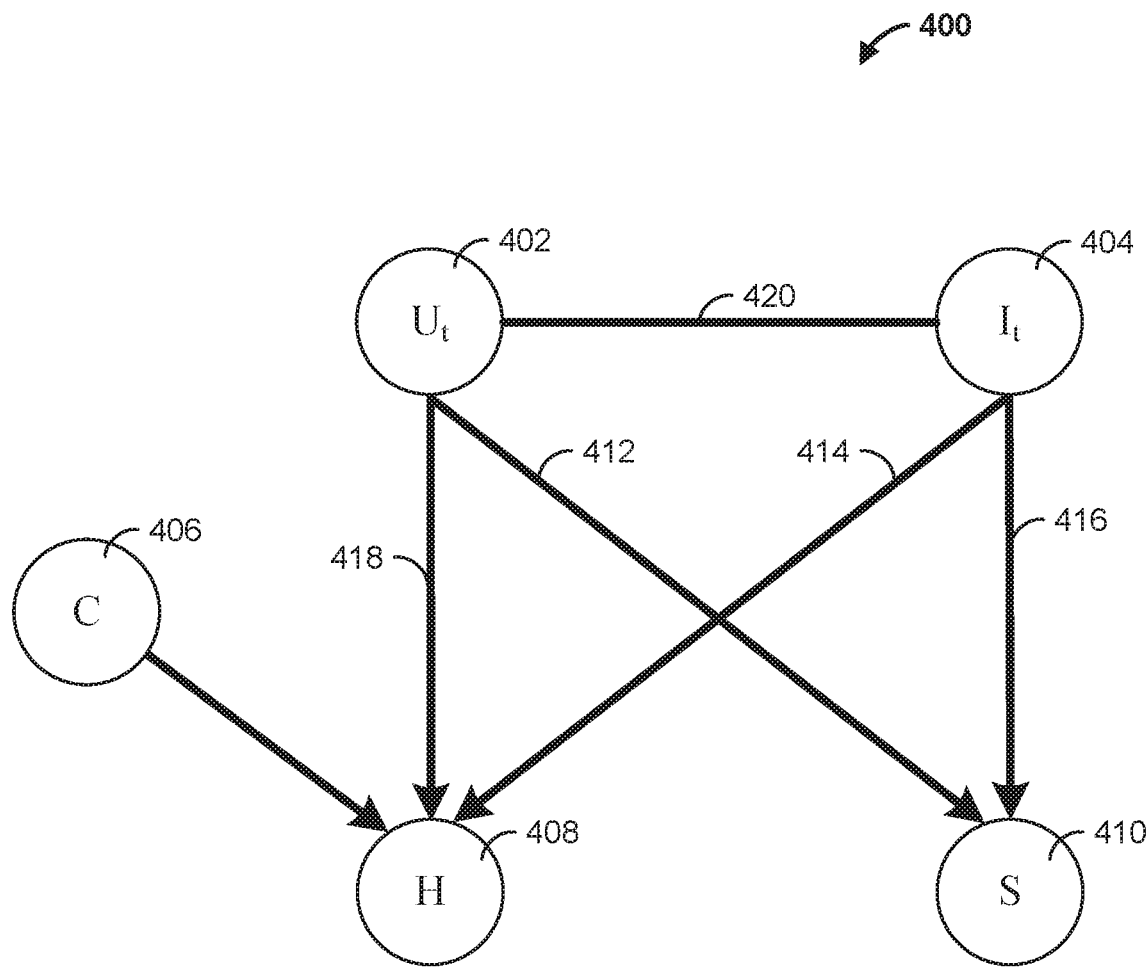
FIG. 4 is a graphical illustration representing causal references based on item seasonality in accordance with some embodiments.

For example, FIG. 4 illustrates a graphical model 400 that illustrates causality of category relevancy. In this example, $U_t$ 402 represents a user's (e.g., customer's) requirement at time t. $U_t$ 402 can represent, for example, a user, a user preference, a user-end purchase motivation or demand, or any other user factor at time t. Time t can identify, for example, a season (e.g., summer), a month (e.g., January), or any other period of time. $I_t$ 404 represents an item, a product-related status for the item (e.g., supply chain, meta data), or any other item factor, at time t.

In addition, the model identifies a context of purchase C 406, a purchase history H 408, and a seasonality S 410. Seasonality S 410 can identify the seasonality of a category of the item. For example, S 410 can identify whether the item is "in season" or "out of season," assuming it is a seasonal item (e.g., based on a computed seasonality score). In some examples, S 410 can identify whether a category of an item is "in season" or "out of season." For example, database 116 may store a listing of items, and categories of items, and identify whether each is seasonal, and if so, in which seasons each item or category is "in season."

Context of purchase C may identify, for example, an item co-purchased with $I_t$ 404, or a view or add-to-cart (e.g., item level) action that is associated with $I_t$ 404. Purchase history H 408 may identify a user's (e.g., user $U_t$ 402) purchase history. For example, if an item is in a user's purchase history, then there is a product purchase event for the item in the users H 408.

In this example, a directed edge (indicated by lines with arrow heads) from "A" to "B" indicates that "A" causes "B." For example, there is a directed edge 412 from $U_t$ 402 to S 410. There is also a directed edge 414 from $I_t$ 404 to H 408, and a directed edge 416 from $I_t$ 404 to S 410. In addition, there is a directed edge 418 from $U_t$ 402 to H 408, and a directed edge 420 from C 406 to H 408

An undirected edge (e.g., without an arrow head) indicates that there is a mutual causality (e.g., "A" can cause "B," and "B" can cause "A"). In this graphical model 400, there is an undirected edge 420 between $U_t$ 402 and $I_t$ 404. As such, each of $U_t$ 402 and $I_t$ 404 could affect each other and thus form mutual causality.

Graphical model 400 assumes that the variable of a purchase H 408 can be determined by the context of purchase C 406, the users' requirement $U_t$ 402, and the product-related status $I_t$ 404 at time t. In addition, S 410, indicating whether the category of the item is in season at time t, can be determined based on both $U_t$ 402 and $I_t$ 404 at a time t.

The equations that follow are based on graphical model 400. The causality of category seasonality can be computed based on Bayesian posterior probability, for example. In the equations below, $H_{i,c}^t$ and $S_{i|u}^t$ represent the conditioning of variables for a user u, for a category i, at a time t, and for a context c. Specifically, $H_{i,c}^t$ represents a general purchase status of i (e.g., whether category i is popular or not) at time t, and $S_{i|u}^t$ represents a seasonality of category i at time t for a group of users (e.g., for previous customers). For simplification, in these examples both H and S can be binary variables. For example, $S_i^t=1$ indicates that a category i is in season at time t, where $S_i^t=0$ indicates that the category i is not in season at time t. Depending on the type of context information (e.g., c), advertisement customization computing device 102 can determine either a product-page recommendation (e.g., where context c represents an anchored product's category), or a next-basket recommendation (e.g., where context c represents previous purchases), for example.

As an example, assume that the probability of a purchase (e.g., item purchase from a website hosted by web server 104) p given a context c, at a time t, is user-neutral, and defined by the equation below.

$$p(H_{i,c}^t=1)=p(S_i^t=1)p(H_{i,c}^t=1|S_i^t=1)+p(S_i^t=0)p(H_{i,c}^t=1|S_i^t=0) \quad \text{(eq. 3)}$$

$S_i^t$, however, may be latent and thus not observed. $p(S_i^t=1)$, however, is related to $p(S_{i|u}^t=1)$, and a case of an individual user can be analyzed. For example, given a user u and a product i at time t, the following equations are analyzed.

$$p(S_{i|u}^t=1 \mid H_{i,c,u}^t) = \frac{p(S_{i|u}^t=1)p(H_{i,c|u}^t \mid S_{i|u}^t=1)}{p(H_{i,c,u}^t)} \quad \text{(eq. 4)}$$

-continued $$p(H_{i,c|u}^t) = \qquad \text{(eq. 5)}$$
$$p(S_{i|u}^t = 1)p(H_{i,c|u}^t \mid S_{i|u}^t = 1) + p(S_{i|u}^t = 0)p(H_{i,c|u}^t \mid S_{i|u}^t = 0)$$

By conditioning equations 4 and 5 on u, i, and t, the following equation can be analyzed.

$$p(S_{i|u}{}^t=1)=p(S_{i|u}{}^t=1 \mid H_{i,c|u}{}^t) \qquad \text{(eq. 6)}$$

According to the above equation, the seasonality of a category i at time t is independent of a purchase event conditional c on a user u. To estimate $p(S_i{}^t=1)$, the equation below is analyzed.

$$p(S_i{}^t)=\Sigma_u p(U=u)p(S_{i|u}{}^t \mid H_{i,c|u}{}^t) \qquad \text{(eq. 7)}$$

Further, $p(S_i{}^t)$ can be estimated stochastically based on the equation below.

$$\tilde{p}(S_i^t) = \frac{1}{N}\sum_{n=1}^{N} \tilde{p}(S_{i|u_n}^t \mid H_{i,c|u_n}^t) \qquad \text{(eq. 8)}$$

Finally, for a group-level item, seasonality $p(S_i{}^t)$ can be viewed as an aggregation of individual temporal purchases. This result can be applied to categories of items. For example, group-level category seasonality can be estimated by individual-level temporal purchase behavior. In an extreme case, for example, if all users behave the same, we can rewrite the above equation and arrive at the equation below.

$$\tilde{p}(S_i{}^t)=\tilde{p}(S_{i|u}{}^t) \qquad \text{(eq. 9)}$$

Assuming individual level behavior $p(H_{i,c|u}{}^t \mid S_{i|u}{}^t=1)$ and $p(H_{i,c|u}{}^t \mid S_{i|u}{}^t=0)$, $p(S_i{}^t)$ can be estimated, and $p(H_{i,c}{}^t=1)$ can be computed.

Seasonality Re-Rank Model

Based on the above analysis, the following model (e.g., algorithm) captures category relevancy drifts from new data (e.g., new online session data).

Let Q be a model of category relevancy trained on a small but new dataset (e.g., seasonal) and P be another model of category relevancy trained on long-term data (e.g., non-seasonal). $Q_{i,c}{}^t$ and $P_{i,c}{}^t$ refer to the relevancy between category i and context c at time t and, for example, can be in range of [0; 1]. $p(H_{i,c}{}^t \mid S_i{}^t=1)$ and $p(H_{i,c}{}^t \mid S_i{}^t=0)$ can be modelled based on $Q_{i,c}{}^t$ and $P_{i,c}{}^t$, respectively, for example.

In an example system where all users are assumed to behave similarly (e.g., make similar purchases), $Q_{i,c}{}^t$ can be used to initialize $p(H_{i,c}{}^t \mid S_i{}^t=1)$. The averaged non-seasonal purchase behavior $p(H_{i,c}{}^t \mid S_i{}^t=0)$ can be initialized by $P_{i,c}{}^t$. $p(H_{i,c}{}^t=1)$ can be initialized to 0.5, for example. The value of $p(H_{i,c}{}^t=1)$ can be updated iteratively, in some examples, by equations 4, 5, 6 above. $p(S_i{}^t)$ can then be updated with $p(S_{i|u}{}^t)$ according to equation 9 above. Finally, the value of $p(H_{i,c}{}^t=1)$ can be estimated from Q and P according to the equations below.

$$\tilde{p}(H_{i,c}^t = 1) = \tilde{p}(S_i^t = 1)Q_{i,c}^t + \tilde{p}(S_i^t = 0)P_{i,c}^t \qquad \text{(eq. 10)}$$

$$\tilde{p}(S_i^t = 1) = \frac{\tilde{p}(S_i^t = 1)Q_{i,c}^t}{\tilde{p}(H_{i,c}^t = 1)} \qquad \text{(eq. 11)}$$

Figure 5:
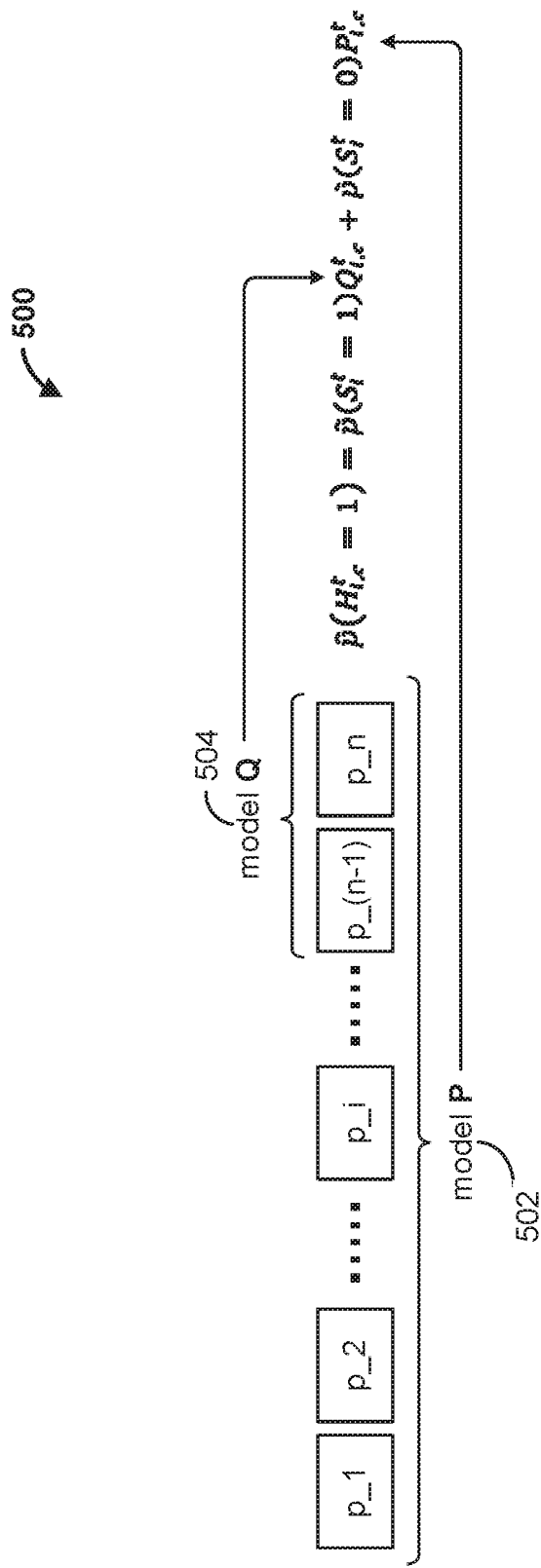
FIG. 5 is a graphical illustration representing a seasonally-based ranking algorithm in accordance with some embodiments.

FIG. 5 graphically illustrates a seasonally-based ranking algorithm 500 based on a casual-inference of item seasonality. The seasonally-based ranking algorithm 500 includes a model P 502 and a model Q 504. The weights applied to model P 502 and a model Q 504 in the seasonally-based ranking algorithm 500 can be determined, for example, based on training the seasonally-based ranking algorithm 500 with historical data.

An example of pseudo code for the algorithm defined by equations 10 and 11 is shown below. In the example, $\alpha_0$ is the initial value of $p(S_{i|c}{}^t)$ and $\beta \in [0, 1]$ is the step size of a moving average. $\alpha_i{}^t$ represents $\tilde{p}(S_i{}^t=1)$. $\Omega$ is the set of categories covered either by Q or P, R is the number of iterations of updating $\alpha_i{}^t$ and $\alpha$ represents the weights applied to models P and Q. Finally, $\tilde{p}(H_{i,c}{}^t=1)$ represents the re-ranked model.

| Algorithm 1 Seasonality Re-rank with Bayesian Assumption |
|---|
| Require: Q, P, c, $\alpha_0$, t, $\beta$, $\Omega$, R; |
| Ensure: |
|   1:    for each category i in $\Omega$ do |
|   2:      if $\alpha_i{}^t$ is NULL then |
|   3:        $\alpha_i{}^t \leftarrow \alpha_0$ |
|   4:      end if |
|   5:      if i not covered by Q but covered by P then |
|   6:        $\tilde{p}(H_{i,c}{}^t = 1) \leftarrow P_{i,c}{}^t$ |
|   7:      else if i not covered by P but covered by Q then |
|   8:        $\tilde{p}(H_{i,c}{}^t = 1) \leftarrow Q_{i,c}{}^t$ |
|   9:      else if i covered by Q and P then |
| 10:        for r from 1 to R do |
| 11:  $$\alpha_i^t \leftarrow \beta\frac{\alpha_i^t Q_{i,c}^t}{\alpha_i^t Q_{i,c}^t + (1-\alpha_i^t)P_{i,c}^t} + (1-\beta)\alpha_i^t$$ |
| 12:        end for |
| 13:        $\tilde{p}(H_{i,c}{}^t = 1) \leftarrow \alpha_i{}^t Q_{i,c}{}^t + (1-\alpha_i{}^t)P_{i,c}{}^t$ |
| 14:      end if |
| 15:    end for |

The same algorithm can be applied to cases where Q and P have different coverages of categories. The final model contains the union of categories of the two models Q and P.

Advertisement customization computing device 102 can execute the above model to operate on the in-store purchase data, online purchase data, and/or online session data to determine a ranking of categories of items that can be advertised to a customer. Advertisement customization computing device 102 may provide item category recommendations to another computing device. The other computing device may provide category advertisements based on the category recommendations, or may advertise items associated with the categories identified in the item category recommendations.

Item Level Advertisement Recommendations

In some examples, advertisement customization computing device 102 can provide item-level recommendations (e.g., instead of category recommendations). For example, advertisement customization computing device 102 can select item advertisements for items associated with (e.g., in) the ranked categories. As an example, advertisement customization computing device 102 may provide for display an advertisement for an item associated with a relatively higher ranked category instead of an item associated with a relatively lower ranked category. In some examples, the item-level recommendations can be personalized to each customer (e.g., each person viewing a retailer's website, such as a website hosted by web server 104).

For example, let Tax( ) be a function that returns the category of an item (e.g., item ID). For example, the function may take an item ID as an input, and may return the category of the item. In some examples, any recommended item $item_i$ is removed for the context item $item_j$ when the relevancy between the category of $item_i$ ($Tax(item_i)$) and the category of $item_j$ ($Tax(item_j)$) computed by a seasonal re-ranked category relevancy model (e.g., as represented by equation 10 or Algorithm 1 above) is less than a threshold θ. In some examples, the remaining recommendations can be ranked according to item-level affinity scores computed according to an item-level model, for example, in a descending order. The item level model may be any model (e.g., machine learning algorithm) that any captures item-to-item relevancy. Advertisement customization computing device 102 may then select a top number of items for advertising to a customer.

Figure 2:
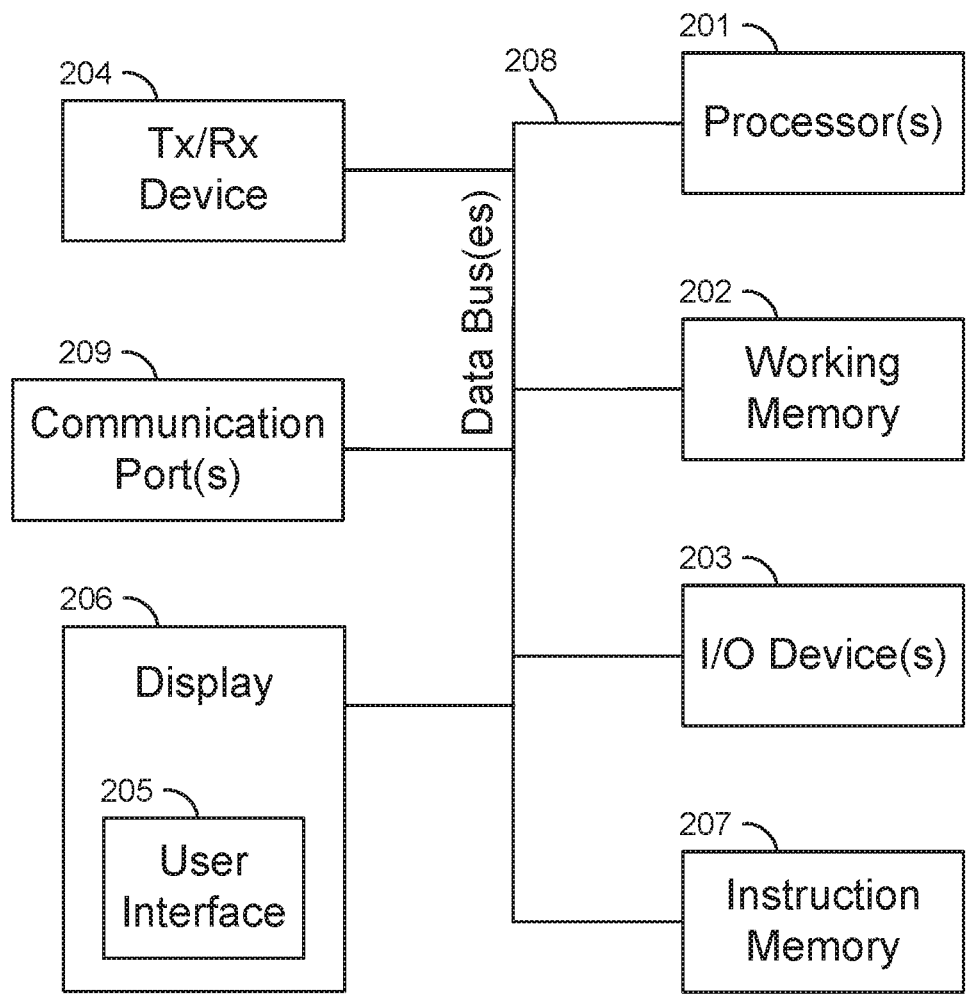
FIG. 2 is a block diagram of the advertisement customization computing device of the digital advertisement customization system of FIG. 1 in accordance with some embodiments.

FIG. 2 illustrates the advertisement customization computing device 102 of FIG. 1. Advertisement customization computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of advertisement customization computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with advertisement customization computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 advertisement customization computing device 102 will be operating in. Processor(s) 201 is operable to receive data from, or send data to, a network, such as communication network 118 of FIG. 1, via transceiver 204.

Figure 3:
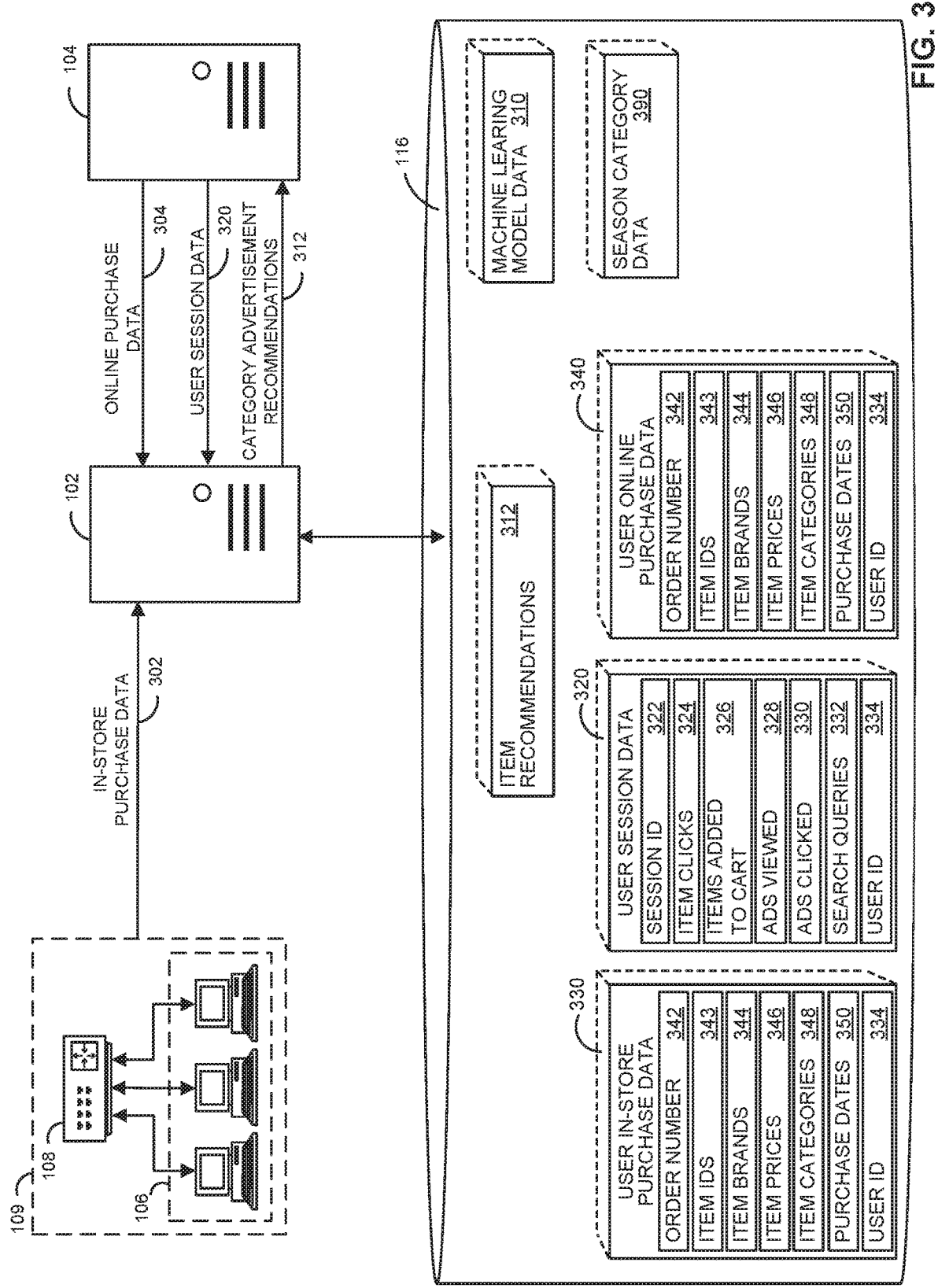
FIG. 3 is a block diagram illustrating examples of various portions of the digital advertisement customization system of FIG. 1 in accordance with some embodiments.

FIG. 3 is a block diagram illustrating examples of various portions of the digital advertisement customization system 100 of FIG. 1. As indicated in the figure, advertisement customization computing device 102 may receive in-store purchase data 302 from store 109. In-store purchase data 302 may identify and characterize items purchased by a customer at store 109. For example, in-store purchase data 302 may identify a history of items purchased in stores for each customer. Advertisement customization computing device 102 may parse in-store purchase data 302 to identify items in each purchase transaction, and may store the parsed data in database 116 as user in-store transactions data 330. For example, user in-store transactions data 330 may include an order number 332 identifying the purchase, item IDs 333 identifying one or more items purchased in the purchase, item brands 338 identifying a brand for each item purchased, item prices 335 identifying the price of each item purchased, item category 336 identifying a category of each item purchased, a purchase date 337 identifying the purchase date of the purchase order, and user ID 334 for the user making the corresponding purchase (e.g., a phone number, a login ID, a name, etc.).

Similarly, advertisement customization computing device 102 may receive online purchase data 304 from web server 104. Online purchase data 304 may identify and characterize items purchased by a customer on a website hosted by web server 104. For example, online purchase data 304 may identify a history of items purchased online by each customer. Advertisement customization computing device 102 may parse online purchase data 304 to identify items in each purchase transaction, and may store the parsed data in database 116 as user online transaction data 340. User online transaction data 340 may include an order number 342 identifying a purchase order, item IDs 343 identifying one or more items purchased in the purchase order, item brands 344 identifying a brand for each item purchased, item prices 346 identifying the price of each item purchased, item categories 348 identifying a category of each item purchased, a purchase date 350 identifying the purchase date of the purchase order, and user ID 334 for the user making the corresponding purchase.

Advertisement customization computing device 102 may also receive user session data 320 from web server 104. User session data 320 identifies, for a user, data related to a browsing session, such as when the user is browsing a retailer's webpage hosted by web server 104, a session start time, item actions such as items added to an online shopping cart, items viewed, item transactions, impressions, or any other data related to a user's browsing session. For example, user session data 320 may identify a history of user session each customer. In this example, user session data 320 may include a session ID 322, item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, search queries 332 identifying one or more searches conducted by the user during the browsing session, and user ID 334 ID (e.g., a customer ID, retailer website login ID, etc.).

Based on one or more of user session data 320, user online transaction data 340, and user in-store transaction data 330, advertisement customization computing device 102 may determine a ranking of item categories for each customer. The ranking of item categories may be used to determine category or item advertisements for the customer.

For example, machine learning model data 310, stored in database 116, may identify and characterize a seasonality re-rank algorithm (e.g., as defined by equation 10 or Algorithm 1, above) that, when executed by advertisement customization computing device 102, generates scores for item categories for a particular season. Based on executing the seasonality re-rank algorithm, advertisement customization computing device 102 generates season category data 390 identifying the item categories. The item categories may be relevant to a customer (e.g., more likely to be purchased) during the season (e.g., a current season). Advertisement customization computing device 102 may store season category data 390 in database 116.

Based on season category data 390, advertisement customization computing device 102 may provide category advertisement recommendations 312 to web server 104. Item category advertisement recommendations 312 identify one or more categories of items that can be advertised to a particular customer, such as one currently browsing a website hosted by web server 104. In some examples, item category advertisement recommendations 312 identify item advertisements. For example, advertisement customization computing device 102 may select, from among a plurality of item advertisements, one or more item advertisements that are associated with item categories identified by season category data 390. Advertisement customization computing device 102 may generate item category advertisement recommendations 312 identifying and characterizing the selected item advertisements.

Figure 6:
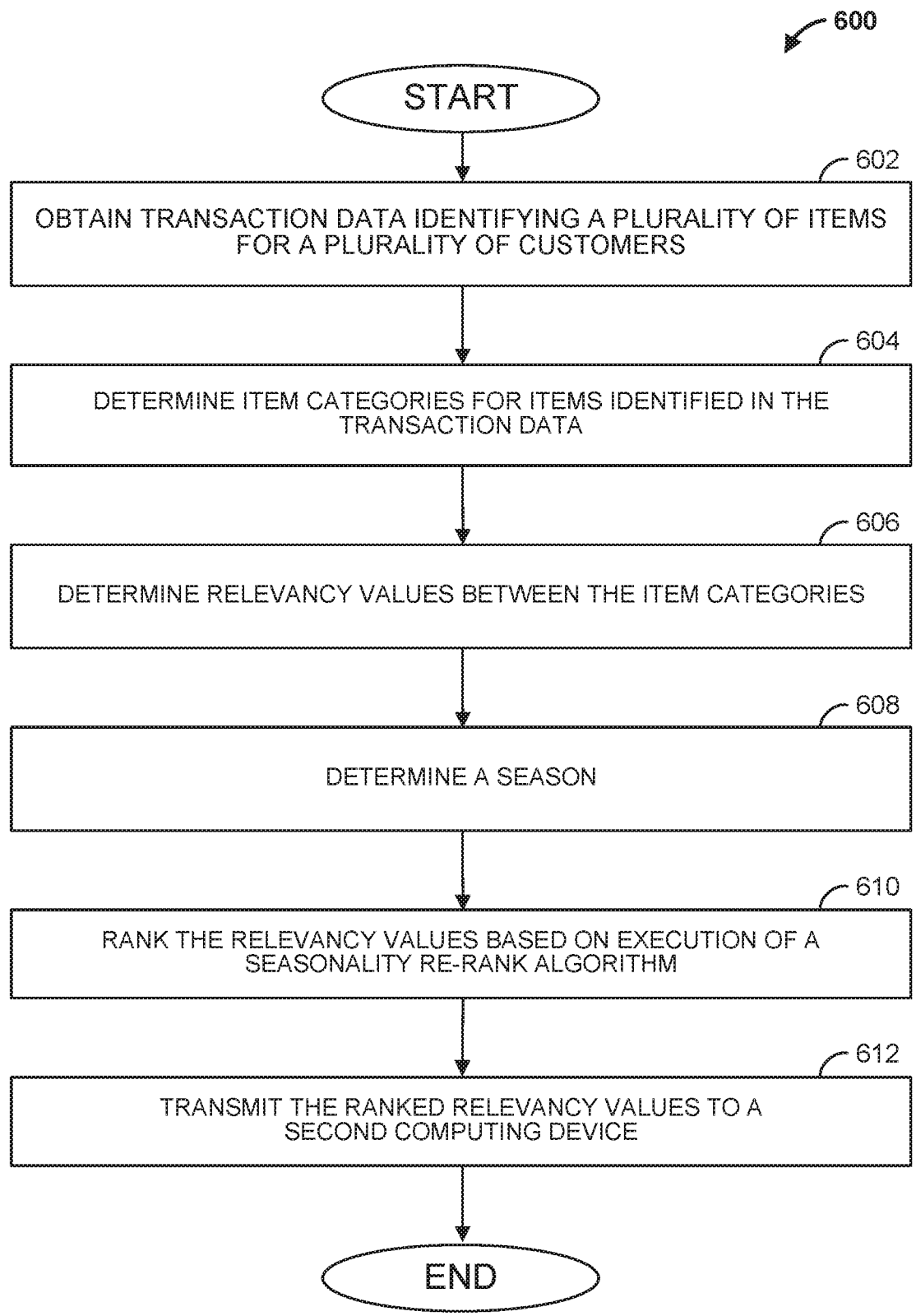
FIG. 6 is a flowchart of an example method that can be carried out by the digital advertisement customization system of FIG. 1 in accordance with some embodiments.

FIG. 6 is a flowchart of an example 600 that can be carried out by the digital advertisement customization system 100 of FIG. 1. Beginning at step 602, transaction data identifying a plurality of items for a plurality of customers is obtained. For example, digital advertisement customization device 102 may obtain user in-store transaction data 330 and user online transaction data 340 from database 116 for a plurality of customers. At step 604, item categories for the items identified in the transaction data are determined. For example, digital advertisement customization device 102 may determine a category for each item based on an item ID for each item identified in the transaction data. At step 606, category relevancy values between the item categories are determined. For example, digital advertisement customization device 102 may execute a machine learning algorithm that receives the transaction data to generate the category relevancy values. The machine learning algorithm may be based on a deep learning process that is trained with the obtained transaction data.

Proceeding to step 608, a season is determined. For example, digital advertisement customization device 102 may determine whether the current time of year is winter, spring, summer, or fall. At step 610, based on the determined season, the category relevancy values are ranked based on execution of a seasonality re-rank algorithm. For example, digital advertisement customization device 102 may execute a seasonality re-rank algorithm based on equations 10 and 11 above, where t identifies the season. At step 612, the re-ranked category relevancy values are transmitted to a second computing device, such as web server 104. The other computing device may determine one or more category or item advertisements based on the received re-ranked category relevancy values. The method then ends.

Figure 7:
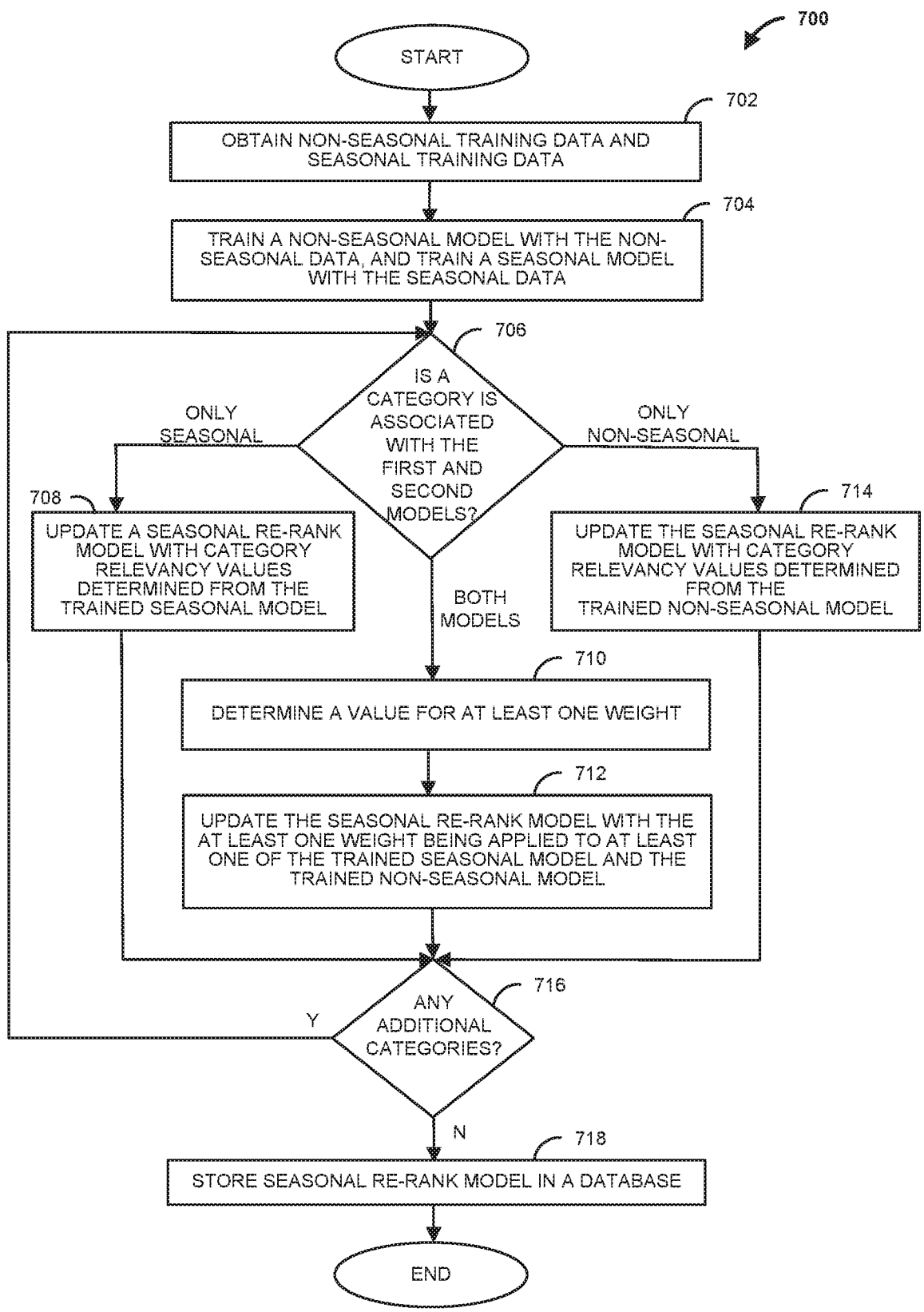
FIG. 7 is a flowchart of another example method that can be carried out by the digital advertisement customization system of FIG. 1 in accordance with some embodiments.

FIG. 7 is a flowchart of an example method 700 that can be carried out by the digital advertisement customization system 100 of FIG. 1. At step 702, a computing device, such as advertisement customization computing device 102, obtains non-seasonal training data and seasonal training data. For example, non-seasonal training data may identify purchases over an entire year, and seasonal training data may identify purchases during one season (e.g., winter, spring, summer, or fall). At step 704, a non-seasonal model is trained with the non-seasonal training data, and a seasonal model is trained with the seasonal training data. For example, advertisement customization computing device 102 may train a non-seasonal model P with the non-seasonal training data, and train a seasonal model Q with the seasonal training data.

At step 706, a determination is made as to whether each category of a plurality of categories is associated with one or both of the seasonal model and the non-seasonal model. The plurality of categories may be the combination of all categories in the seasonal model and the non-seasonal model. If the category is part of the seasonal model but not the non-seasonal model, the method proceeds to step 708. If the category is part of both the seasonal model and the non-seasonal model, the method proceeds to step 710. If the category is part of the non-seasonal model but not the seasonal model, the method proceeds to step 714.

At step 708, a seasonal re-rank model is updated with category relevancy values determined from the trained seasonal model for the current category. The method then proceeds to step 716.

At step 710, a value for at least one weight is determined. For example, advertisement customization computing device 102 may iteratively update the value of the at least one weight when the corresponding category is part of both the seasonal model and the non-seasonal model. At step 712, the seasonal re-rank model is then updated with the at least one weight being applied to at least one of the trained seasonal model and the trained non-seasonal model. The method then proceeds to step 716.

At step 714, the seasonal re-rank model is updated with category relevancy values determined from the trained non-seasonal model for the current category. The method then proceeds to step 716.

At step 716, a determination is made as to whether there are any additional categories. If there are additional categories, the method proceeds back to step 706. Otherwise, if there are no additional categories, the method proceeds to step 718.

At step 718, data identifying and characterizing the seasonal re-rank model is stored in a database. The seasonal re-rank model identifies probabilities of purchase of categories of items. For example, advertisement customization computing device 102 may generate machine learning model data 310 identifying and characterizing the seasonal re-rank model, and may store machine learning model data 310 in database 116. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a database; and
a computing device communicatively coupled to the database and configured to:
obtain, from the database, a first model trained with seasonal data identifying first item categories;
obtain, from the database, a second model trained with non-seasonal data identifying second item categories;
obtain, from the database, transaction data identifying a plurality of historical transactions for a plurality of customers;
determine a category of a plurality of categories for each of the plurality of historical transactions;
determine whether each category of the plurality of categories is included in one or more of the first item categories and second item categories;
train the first model with each of the plurality of historical transactions that correspond to the first item categories;
train the second model with each of the plurality of historical transactions that correspond to the second item categories;
store the trained first model and the trained second model as a seasonal re-rank model in the database;
obtain a ranking of categories;
apply the seasonal re-rank model to the ranking of categories; and
re-rank the ranking of categories based on the application of the seasonal re-rank model to the ranking of categories.

2. The system of claim 1, wherein determining whether each category of the plurality of categories is included in one or more of the first item categories and second item categories comprises:
determining whether each category is included in the first item categories but not in the second item categories;
determining whether each category is included in the second item categories but not in the first item categories; and
determining whether each category is included in both the first item categories and the second item categories.

3. The system of claim 2, wherein the computing device is further configured to determine a probability based on the first model when the determination is made that a category is included in the first item categories but not in the second item categories, wherein the seasonal re-rank model comprises the determined probability.

4. The system of claim 2, wherein the computing device is further configured to determine a probability based on the second model when the determination is made that a category is included in the second item categories but not in the first item categories, wherein the seasonal re-rank model comprises the determined probability.

5. The system of claim 2, wherein the computing device is further configured to:
update a weight of at least one of the first model and the second model when the determination is made that a category is included in both of the first item categories and the second item categories; and
apply the weight to the at least one of the first model and the second model, wherein the seasonal re-rank model comprises the at least one of the first model and the second model with the applied weight.

6. The system of claim 1, wherein the seasonal data identifies first item categories of items purchased during one of the winter, spring, summer, or fall.

7. The system of claim 1, wherein the computing device is further configured to:
obtain the seasonal re-rank model from the database;
apply the seasonal re-rank model to customer session data for a customer to determine a category of items to advertise to the customer.

8. The system of claim 7, wherein the computing device is further configured to:
determine a first probability value for a first category based on applying the seasonal re-rank model;
determine a second probability value for a second category based on applying the seasonal re-rank model;
rank the first category and the second category based on the first probability value and the second probability value; and wherein determining the category of items to advertise is based on the ranking.

9. The system of claim 7, wherein the computing device is further configured to transmit the category of items to a second computing device.

10. A method comprising:
obtaining, from a database, a first model trained with seasonal data identifying first item categories;
obtaining, from the database, a second model trained with non-seasonal data identifying second item categories;
obtaining, from the database, transaction data identifying a plurality of historical transactions for a plurality of customers;
determining a category of a plurality of categories for each of the plurality of historical transactions;
determining whether each category of the plurality of categories is included in one or more of the first item categories and second item categories;
training the first model with each of the plurality of historical transactions that correspond to the first item categories;
training the second model with each of the plurality of historical transactions that correspond to the second item categories;
storing the trained first model and the trained second model as a seasonal re-rank model in the database;
obtaining a ranking of categories;
applying the seasonal re-rank model to the ranking of categories; and
re-ranking the ranking of categories based on the application of the seasonal re-rank model to the ranking of categories.

11. The method of claim 10 wherein determining whether each category of the plurality of categories is included in one or more of the first item categories and second item categories comprises:
determining whether each category is included in the first item categories but not in the second item categories;
determining whether each category is included in the second item categories but not in the first item categories; and
determining whether each category is included in both the first item categories and the second item categories.

12. The method of claim 11 further comprising determining a probability based on the first model when the determination is made that a category is included in the first item categories but not in the second item categories, wherein the seasonal re-rank model comprises the determined probability.

13. The method of claim 11 further comprising determining a probability based on the second model when the determination is made that a category is included in the second item categories but not in the first item categories, wherein the seasonal re-rank model comprises the determined probability.

14. The method of claim 11 further comprising:
updating a weight of at least one of the first model and the second model when the determination is made that a category is included in both of the first item categories and the second item categories; and
applying the weight to the at least one of the first model and the second model, wherein the seasonal re-rank model comprises the at least one of the first model and the second model with the applied weight.

15. A non-transitory computer readable medium having instructions stored thereon, wherein the instructions, when executed by at least one processor, cause a device to perform operations comprising:
obtaining, from a database, a first model trained with seasonal data identifying first item categories;
obtaining, from the database, a second model trained with non-seasonal data identifying second item categories;
obtaining, from the database, transaction data identifying a plurality of historical transactions for a plurality of customers;
determining a category of a plurality of categories for each of the plurality of historical transactions;
determining whether each category of the plurality of categories is included in one or more of the first item categories and second item categories;
training the first model with each of the plurality of historical transactions that correspond to the first item categories;
training the second model with each of the plurality of historical transactions that correspond to the second item categories;
storing the trained first model and the trained second model as a seasonal re-rank model in the database;
obtaining a ranking of categories;
applying the seasonal re-rank model to the ranking of categories; and
re-ranking the ranking of categories based on the application of the seasonal re-rank model to the ranking of categories.

16. The non-transitory computer readable medium of claim 15 wherein the instructions stored thereon, when executed by the at least one processor, further cause the device to perform operations comprising:
determining whether each category is included in the first item categories but not in the second item categories;
determining whether each category is included in the second item categories but not in the first item categories; and
determining whether each category is included in both the first item categories and the second item categories.

17. The non-transitory computer readable medium of claim 16, wherein the instructions stored thereon, when executed by the at least one processor, further cause the device to perform operations comprising:
updating a weight of at least one of the first model and the second model when the determination is made that a category is included in both of the first item categories and the second item categories; and
applying the weight to the at least one of the first model and the second model, wherein the seasonal re-rank model comprises the at least one of the first model and the second model with the applied weight.

* * * * *